(12) United States Patent
Maor et al.

(10) Patent No.: US 11,977,987 B2
(45) Date of Patent: May 7, 2024

(54) AUTOMATIC HYPOTHESIS GENERATION USING GEOSPATIAL DATA

(71) Applicant: SparkBeyond LTD, Netanya (IL)

(72) Inventors: Meir Maor, Netanya (IL); Ron Karidi, Herzeliya (IL); Sagie Davidovich, Zichron Yaakov (IL); Guy Shaked, Tel Aviv (IL)

(73) Assignee: SPARKBEYOND LTD, Netanya (IL)

( * ) Notice: Subject to any disclaimer, the term of this patent is extended or adjusted under 35 U.S.C. 154(b) by 847 days.

(21) Appl. No.: 15/807,551

(22) Filed: Nov. 8, 2017

(65) Prior Publication Data

US 2019/0138622 A1 May 9, 2019

(51) Int. Cl.
*G06F 16/29* (2019.01)
*G06F 17/18* (2006.01)
*G06F 18/214* (2023.01)
*G06N 5/022* (2023.01)
*G06N 5/045* (2023.01)
*G06N 20/00* (2019.01)

(52) U.S. Cl.
CPC ............. *G06N 5/022* (2013.01); *G06F 16/29* (2019.01); *G06F 17/18* (2013.01); *G06F 18/214* (2023.01); *G06N 5/045* (2013.01); *G06N 20/00* (2019.01)

(58) Field of Classification Search
CPC ........ G06F 16/29; G06F 17/18; G06F 16/248; G06F 16/951; G06F 16/9537; G06F 16/90344; G06F 16/9535; G06F 16/9566; G06F 18/214; G06N 5/022; G06N 5/045; G06N 20/00; G06K 9/6256
See application file for complete search history.

(56) References Cited

U.S. PATENT DOCUMENTS

| | | | |
|---|---|---|---|
| 6,098,107 A * | 8/2000 | Narvaez-Guarnieri | ..................... H04L 45/02 709/239 |
| 6,865,582 B2 * | 3/2005 | Obradovic | ........... G06K 9/6253 |
| 9,904,659 B1 * | 2/2018 | Stupp | ...................... G06F 17/18 |
| 10,438,132 B2 * | 10/2019 | Duggan | .................. G06F 16/22 |
| 2011/0258237 A1 * | 10/2011 | Thomas | ............ G06F 16/90344 707/803 |
| 2012/0330865 A1 * | 12/2012 | Rajaram | ................ G06Q 90/00 706/12 |
| 2013/0127869 A1 * | 5/2013 | Winnemoeller | ...... G06T 11/203 345/441 |

(Continued)

OTHER PUBLICATIONS

Krzysztof Kopersky et al., An Efficient Two-Step Method for Classification of Spatial Data (1999).

(Continued)

*Primary Examiner* — Cam Y T Truong

(57) ABSTRACT

A method, apparatus and product for automatic hypothesis generation using geospatial data. A labeled dataset and an auxiliary dataset are obtained. Instances comprise geospatial attributes. Hypothesis generation is performed automatically based on the labeled dataset. For each labeled instance, one or more auxiliary instances are selected from the auxiliary dataset based on a geospatial relation between the geospatial attribute of the labeled instance and the geospatial attribute of the auxiliary instance. Based on the selected auxiliary instances, one or more new attributes are computed and added to the labeled instance.

26 Claims, 6 Drawing Sheets

(56) References Cited

U.S. PATENT DOCUMENTS

| | | | | |
|---|---|---|---|---|
| 2014/0043436 | A1* | 2/2014 | Bell | H04N 13/10 |
| | | | | 348/46 |
| 2014/0250033 | A1* | 9/2014 | Lospinoso | G06N 20/00 |
| | | | | 706/12 |
| 2015/0049634 | A1* | 2/2015 | Levchuk | G06Q 50/01 |
| | | | | 370/254 |
| 2016/0140143 | A1* | 5/2016 | Anklam | G06F 16/29 |
| | | | | 707/756 |
| 2016/0171011 | A1* | 6/2016 | Drogobetski | G06F 16/29 |
| | | | | 707/722 |
| 2016/0196677 | A1* | 7/2016 | Agrawal | G06F 16/2255 |
| | | | | 345/440 |
| 2016/0316341 | A1* | 10/2016 | Vaccari | G06Q 30/02 |
| 2017/0041407 | A1* | 2/2017 | Wilbur | H04L 67/10 |
| 2019/0034083 | A1* | 1/2019 | Cherubini | G06F 3/0631 |

OTHER PUBLICATIONS

Richard Frank et al., A Multi-Relational Approach to Spatial Classification (2009).

Mennis J et al., Spatial data mining and geographic knowledge discovery—An introduction (2009).

* cited by examiner

AUTOMATIC HYPOTHESIS GENERATION USING GEOSPATIAL DATA

TECHNICAL FIELD

The present disclosure relates to machine learning and big data analysis in general, and to hypothesis generation based on geospatial data, in particular.

BACKGROUND

Machine learning and big data analysis attempt to extract information from a dataset and provide prediction on new datasets or insights. However, the effectiveness of the prediction model built based on a dataset and of the insights that can be derived from a dataset are greatly influenced by the attributes that are generated from the data and are analyzed.

Feature engineering is the process of using domain knowledge of the data to create the features that are used for creating the prediction model. Feature engineering is fundamental to the application of machine learning and big data analysis, and is both difficult and expensive. The quality and quantity of the features will have great influence on whether the model's quality is good or not.

Wikipedia provides (at the entry "Feature Engineering") that the process of feature engineering includes several separate steps: Brainstorming Or Testing features; Deciding what features to create; Creating features; Checking how the features work with your model; Improving your features if needed; and Go back to brainstorming/creating more features until the work is done.

Some features may be strongly relevant, relevant, weakly relevant, or irrelevant. In some cases, one feature may have exclusive information that does not exist in any other feature. On the other hand, some feature may include redundant information or duplicative information to that which is represented by other features. Still, creating many various features may be desired, from which feature selection may be performed. Feature selection may be performed to prevent overfitting, to avoid curse of dimensionality, speed up training process, simplify the models and make them easier for interpretation by humans, or the like.

BRIEF SUMMARY

One exemplary embodiment of the disclosed subject matter is a method comprising: obtaining a labeled dataset, wherein each labeled instance in the labeled dataset comprising one or more attributes and a target label, wherein the one or more attributes comprise, directly or indirectly, at least one geospatial attribute; obtaining an auxiliary dataset, wherein the auxiliary dataset comprising auxiliary instances, each of which comprising attributes, wherein the attributes comprising one or more geospatial attributes; and automatically performing, by a computer, hypothesis generation based on the labeled dataset, wherein said automatically performing hypothesis generation comprises, for each labeled instance in the labeled dataset: selecting one or more auxiliary instances in the auxiliary dataset based on a geospatial relation between the at least one geospatial attribute of the labeled instance and the one or more geospatial attribute of the auxiliary instance; computing, based on selected one or more auxiliary instances, one or more new attributes; and adding the one or more new attributes to the labeled instance.

Optionally, said automatically performing hypothesis generation comprises: computing a distance between the at least one geospatial attribute of the labeled instance and between the one or more geospatial attribute of the auxiliary instance.

Optionally, said selecting comprises utilizing the distance to determine the geospatial relation.

Optionally, said computing comprises utilizing the distance to compute the one or more new attributes.

Optionally, said selecting comprises selecting the one or more auxiliary instances whose geospatial location is within a threshold distance from a geospatial location of the labeled instance.

Optionally, said computing comprises computing a number of entities having a value of an attribute in the selected one or more auxiliary instances, wherein the one or more new attributes comprise a new attribute representing the number of entities having a value of an attribute within a threshold distance from the geospatial location of the labeled instance.

Optionally, said computing comprises determining one or more attributes of a closest instance of an entity type to the geospatial location of the labeled instance based on the selected one or more auxiliary instances, wherein the one or more new attributes comprise a new attribute representing a value of an attribute of the entity type for the closest instance of the entity type to the geospatial location of the labeled instance.

Optionally, said automatically performing hypothesis generation comprises: determining a collection of entities within a threshold distance of a geospatial location of the labeled instance, wherein the geospatial location of the labeled instance is determined based on the at least one geospatial attribute of the labeled instance.

Optionally, the one or more new attributes comprise a plurality of new attributes, each of which stating a minimal distance to an instance of a different entity type.

Optionally, said selecting the one or more auxiliary instances is based on each of the one or more auxiliary instances comprising a containing shape that comprises a geospatial representation of the labeled instance, wherein the one or more new attributes comprise attributes associated with containing shapes as indicated in the one or more auxiliary instances.

Optionally, the method further comprises building a predictive model based on the labeled dataset and the new attributes of each labeled instance in the labeled dataset.

Optionally, the method further comprises analyzing the labeled dataset and the new attributes of each labeled instance in the labeled dataset to derive geospatial insights; and displaying the geospatial insights to a user.

Optionally, the method further comprises performing hypothesis validation to select a proper subset of one or more potential hypotheses, wherein each of the one or more potential hypotheses is associated with at least one of the one or more new attributes.

Optionally, the method further comprising performing an abstraction method to enrich the auxiliary dataset with abstracted features, wherein said automatically performing hypothesis generation comprises using the abstracted features.

Another exemplary embodiment of the disclosed subject matter is a computerized apparatus having a processor, the processor being adapted to perform the steps of: obtaining a labeled dataset, wherein each labeled instance in the labeled dataset comprising one or more attributes and a target label, wherein the one or more attributes comprise, directly or indirectly, at least one geospatial attribute; obtaining an auxiliary dataset, wherein the auxiliary dataset comprising auxiliary records, each of which comprising attributes, wherein the attributes comprising one or more geospatial attributes; and automatically performing, by a computer, hypothesis generation based on the labeled dataset wherein said automatically performing hypothesis generation comprises, for each labeled instance in the labeled dataset: selecting one or more auxiliary instances in the auxiliary dataset based on a geospatial relation between the at least one geospatial attribute of the labeled instance and the one or more geospatial attribute of the auxiliary instance; computing, based on selected one or more auxiliary instances, one or more new attributes ; and adding the one or more new attributes to the labeled instance.

Another exemplary embodiment of the disclosed subject matter is a computer program product comprising a non-transitory computer readable storage medium retaining program instructions, which program instructions when read by a processor, cause the processor to perform a method comprising: obtaining a labeled dataset, wherein each labeled instance in the labeled dataset comprising one or more attributes and a target label, wherein the one or more attributes comprise, directly or indirectly, at least one geospatial attribute; obtaining an auxiliary dataset, wherein the auxiliary dataset comprising auxiliary instances, each of which comprising attributes, wherein the attributes comprising one or more geospatial attributes; and automatically performing, by a computer, hypothesis generation based on the labeled dataset, wherein said automatically performing hypothesis generation comprises, for each labeled instance in the labeled dataset: selecting one or more auxiliary instances in the auxiliary dataset based on a geospatial relation between the at least one geospatial attribute of the labeled instance and the one or more geospatial attribute of the auxiliary instance; computing, based on selected one or more auxiliary instances, one or more new attributes; and adding the one or more new attributes to the labeled instance.

Optionally, said automatically performing hypothesis generation comprises: computing a distance between the at least one geospatial attribute of the labeled instance and between the one or more geospatial attribute of the auxiliary instance.

Optionally, said selecting comprises utilizing the distance to determine the geospatial relation.

Optionally, said computing comprises utilizing the distance to compute the one or more new attributes.

Optionally, said selecting comprises selecting the one or more auxiliary instances whose geospatial location is within a threshold distance from a geospatial location of the labeled instance.

Optionally, said automatically performing hypothesis generation comprises: determining a collection of entities within a threshold distance of a geospatial location of the labeled instance, wherein the geospatial location of the labeled instance is determined based on the at least one geospatial attribute of the labeled instance.

Optionally, said selecting the one or more auxiliary instances is based on each of the one or more auxiliary instances comprising a containing shape that comprises a geospatial representation of the labeled instance, wherein the one or more new attributes comprise attributes associated with containing shapes as indicated in the one or more auxiliary instances.

Optionally, the method further comprises building a predictive model based on the labeled dataset and the new attributes of each labeled instance in the labeled dataset.

Optionally, the method further comprises analyzing the labeled dataset and the new attributes of each labeled instance in the labeled dataset to derive geospatial insights; and displaying the geospatial insights to a user.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
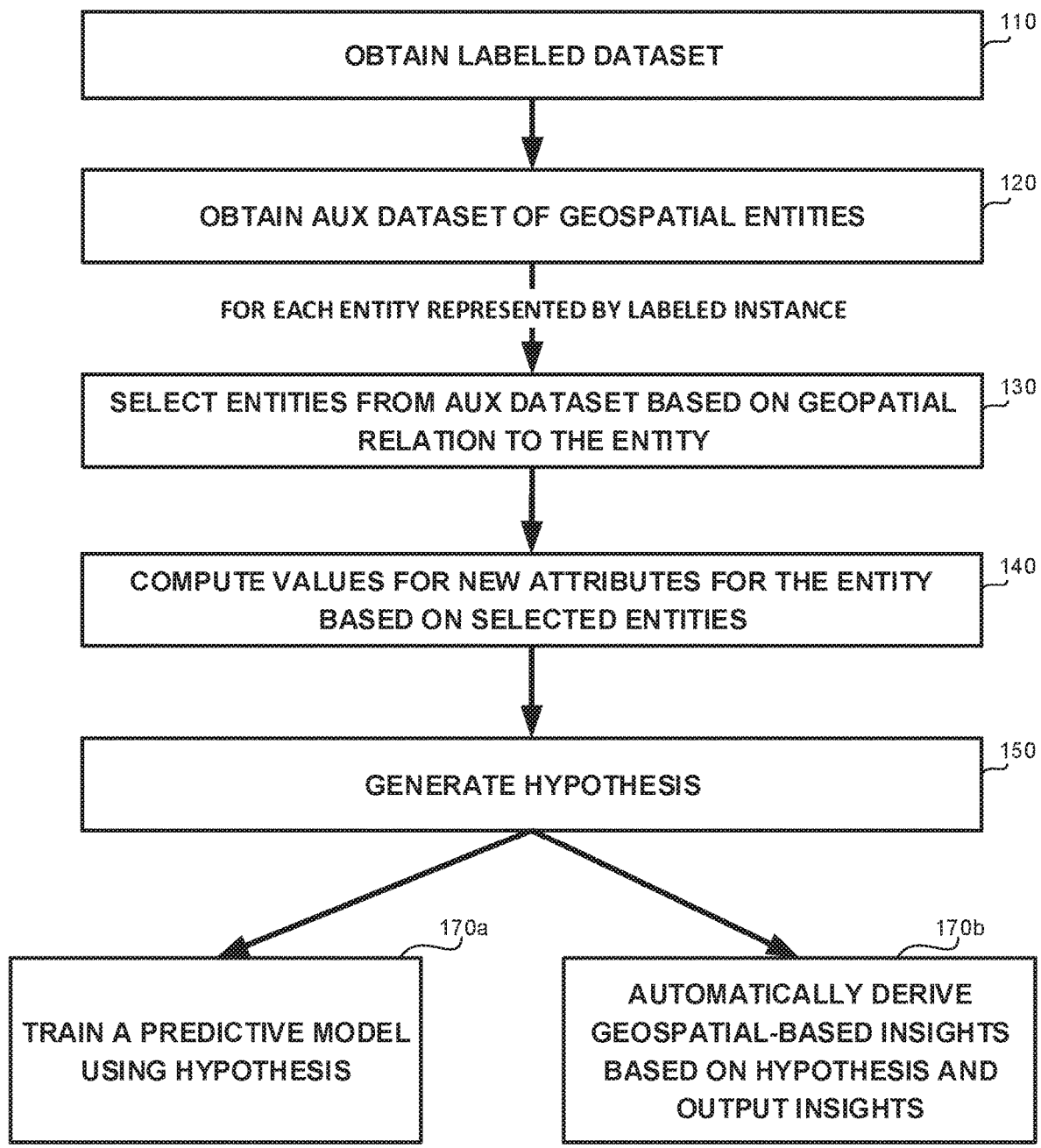
FIG. 1 shows a flowchart diagram of a method, in accordance with some exemplary embodiments of the disclosed subject matter.

One technical problem dealt with by the disclosed subject matter is to utilize geospatial data for machine learning and for big data analysis.

Many datasets now have a geospatial attributes, either directly or indirectly. In some cases, instances may comprise an explicit location information, such as a coordinate, an address, a ZIP code, a polygon, or the like. Additionally or alternatively, the instances may comprise implicit location information, such as by referencing another entity which can be translated into a geographical location. For example, referring to a named entity which has a geospatial location. In some cases, the referenced entity may be the entity itself and such entity may have a known location. Consider, for example, that the instances may indicate that the entity is "Eiffel Tower" without providing any location thereof. However, such landmark has a known location that can be obtained and used.

In some exemplary embodiments, accumulated knowledge of additional geospatial data may be publically available. Such knowledge may include information about of where entities are located with attributes on these entities. As an example, OpenStreetMap™ (OSM) is a collaborative project publishing geographic information. OSM comprises key-value pairs of strings for representing metadata about the map objects, such as their type, their name, their physical properties, or the like. The key-value pair are associated with an object, such as a node, a way, or a relation. As another example, Shape files and other geospatial databases may also be available.

It may be desired to automatically generate hypothesis based on geospatial data. The hypothesis may be indicative of a label to be assigned to the instance, and therefore may be useful in classification and label prediction. In some cases, the hypothesis may be used to define one or more new features in a machine learning model. Additionally or alternatively, the hypothesis may be used as a basis for an insight about an entity, even if the label is known. For example, a hypothesis as to whether a client will churn or not churn may be useful to understand the motivations of clients and allow an organization to improve its operation to reduce churn. The insights may indicate correlations between a target variable of interest and how the entity relates to its surrounding area, as described by one or more geospatial reference sources. Such insights may be presented to a user, for usage thereof. For example, the user may be notified that a certain distance from a train station is imperative for a convenient store to have an above-standard revenue. Such insight may be used by the user to decide to re-locate her store to a new location.

One technical solution may be to automatically perform hypothesis generation based on an auxiliary dataset which comprises geospatial information. The auxiliary dataset is filtered to match auxiliary records to the instances of the dataset of interest, and based thereon, additional attributes are introduced to the dataset of interest. It will be noted that there are computational and statistical challenges in doing so.

In some exemplary embodiments, geospatial attributes of nearby entities may be collected from reference entities. As an example, the nearest instance of each type of entity (e.g., nearest store, nearest food store, nearest bus station, nearest bus station in which line 78 stops, etc.). In some cases, the minimal distance of each type of entity may be computed and added as a new attribute (e.g., 50 m from the closest a gas station, 120 m from the nearest pharmacy which covers a certain type of medical insurance, 520 m from a parking lot which accept a form of mobile-based payment, etc.). As another example, the number of instances within a threshold distance (e.g., radius of about 50 m, 200 m, 1 km, 5 km, or the like) of each type of entity may be counted and provided as another newly computed attribute (e.g., within 1 km there are: 5 pharmacies, 28 bars, only 1 supermarket, 10 gas stations, 5 parking lots and 3 parking lots which accept a form of mobile-based payment, etc.). Additionally or alternatively, the attributes of the closest instance of an entity of each type may be added to the instance. For example, the bus lines which stop at the closest bus station; the number of parking spaces at the nearest parking lot, the acceptable payment forms at the nearest parking lot, the number of floors of the nearest parking lot, or the like. In some exemplary embodiments, the instances may be enriched by attributes associated with containing shapes thereof, such as polygon shapes which represent neighborhoods, malls, parking zones, or the like.

By enriching the instances with additional features that are based on geospatial relationships with other entities, geospatial based hypotheses may be validated, such as determining that a high yield of a supermarket is related to the number of near-by parking lots and their sizes, as well as to identifying that a success of a store is positively correlated with a near-by rail station but negatively correlated with a near-by shopping mall. In some cases, it may be determined that a shopping mall within 100 m may correlate with high sales which a shopping mall within 101 m-250 m correlates with low sales. Such hypothesis may be the basis of an insight that may be displayed directly to a user. Additionally or alternatively, the hypotheses may be utilized by a predictive model. The newly computed attributes that are associated with the hypotheses may be used in the predictive model as a feature of an instance or basis thereof. The predictive model may be trained using a training dataset to which the computed attributes are added.

In some exemplary embodiments, in order to reduce the number of overall attributes, not all new attributes are added to the instances. Instead, the potential hypotheses may be examined first and validated. Only attributes that are associated validated hypotheses may be used. The potential hypotheses may be validated by examining the data and determining whether the data refutes each potential hypothesis. Validation may be performed using a statistical metric, such as entropy, correlation, chi-squared test, or the like.

For example, given the problem of explaining, predicting or optimizing store revenue, the disclosed subject matter may be utilized to discover that close railway stations positively correlate with sales. The distance from stores to a multitude of entities in reference data sources each with its own attributes may be examined. Each attribute may be treated individually. Attributes could be key-value pairs or come in column form where each entity from a given source has the same attribute keys. Based on such examination, a substantial number of potential hypotheses may be found. The potential hypotheses may be examined using a statistical metric, from which the potential hypotheses that the distance from railway station is indicative of the label may appear to be of statistical significance. As a result, the potential hypothesis may be deemed as validated and such attribute is added, and may be used to predict revenues of other stores, to explain revenues of given stores, and to assist in improving and optimizing revenues of stores, such as by making them more accessible to traffic originating from the railway station, selling products which correlate positively with nearby railway stations, only if the stores have nearby railway stations, or the like.

In some exemplary embodiments, the disclosed subject matter may comprise obtaining a labeled dataset. The labeled dataset may comprise labeled instances, each of which comprising attributes and target labels. The instances may be provided in explicit format or implicit format, such as using key-value pairs to represent different attributes for each instance. Among the attributes of the instances, there may be attributes indicating a geospatial location of the entity represented by the instance. The attribute may indicate the geospatial location directly or indirectly. An auxiliary dataset comprising geospatial-related information may be obtained. The auxiliary dataset may comprise instances representing entities with geospatial presence.

In accordance with the disclosed subject matter, hypothesis generation may be performed automatically by a computer. The hypothesis generation may be performed to identify hypotheses that are based on geospatial data. The hypotheses may be based on computable attributes that can be computed using the auxiliary dataset. In some cases, for each labeled instance in the labeled dataset, relevant auxiliary instances may be selected based on a geospatial relation between the entity represented by the labeled instance and the entities represented by the auxiliary instances. Value for new attributes may be automatically computed based on the selected auxiliary instances. The potential hypotheses may be filtered based on a statistical metric, and potential hypotheses that pass such filtering process may validated, and new attributes computed to test the hypothesis on an instance may be added to the labeled instances, thereby enriching the labeled instances with geospatial-based attributes that are potentially indicative of a label.

In some exemplary embodiments, the auxiliary dataset may be enriched using abstraction methods, such as abstraction dictionaries, prior to the use thereof for hypothesis generation. As another example, a dictionary-free abstraction may involve looking at the existence of an attribute regardless of its value or at the existence of a string in a text value. In some cases, the enrichment of the auxiliary dataset using abstraction methods may not necessarily be performed prior to the commencement of the hypothesis generation. Instead, for efficiency purposes and in order to provide an efficient implementation, the enrichment may be interspersed throughout the hypothesis generation operation.

One technical effect of utilizing the disclosed subject matter is to provide for efficient geospatial-based hypothesis generation, without the use of domain knowledge and in an automated manner.

Another technical effect is to provide for efficient geospatial-based feature engineering. Feature engineering may be a hard task, which is normally performed manually and requires extensive resources and experience. In some cases, the indicative features may be features that might not be intuitive to a person. As a person does not systematically check all possible features, the disclosed subject matter may be useful in discovering useful features which a person would not have identified. Utilizing an automated process to perform the feature engineering overcomes such challenges. Additionally or alternatively, utilizing geospatial-based data for the feature engineering enables the inclusion of extensive additional auxiliary datasets and to derive meaningful insights therefrom.

It is uncommon to rely on geospatial data for predictive models, as such data in itself is not indicative of a correct label. It is the various geospatial relationships between entities having geospatial representation that may be indicative of the label. By enumerating all potential new attributes, the entire knowledge encapsulated by the auxiliary dataset is utilized. In some cases, to allow for an efficient processing, the auxiliary dataset may be limited to the vicinity of the entities at question, such as within about 10 km radius from each entity, such as up to 1,000 auxiliary entities in the vicinity of each entity of interest, such as up to 50,000 auxiliary attributes of entities in the vicinity of each entity of interest, or the like.

The disclosed subject matter may provide for one or more technical improvements over any pre-existing technique and any technique that has previously become routine or conventional in the art.

Additional technical problem, solution and effects may be apparent to a person of ordinary skill in the art in view of the present disclosure.

Referring now to FIG. 1 showing a flowchart diagram of a method, in accordance with some exemplary embodiments of the subject matter.

On Step 110, a labeled dataset may be obtained. The labeled dataset may comprise instances representing entities, each of which having a geospatial representation using at least one geospatial attribute. Each instance may be paired with a label. For example, each instance may represent a store, and the label may be a revenue score of the store. In some cases, the labeled dataset may be obtained from different sources which may be merged together, such as different databases, different tables in a same database, or the like. In some cases, the label may be obtained from one data source, while some attributes may be obtained from another data source, where the label of the instance is unknown.

On Step 120, an auxiliary dataset may be obtained. The auxiliary dataset may comprise instances representing entities, each of which having a geospatial representation using at least one geospatial attribute.

For each entity of interest (e.g., instances in the labeled dataset), Steps 130-140 may be performed.

On Step 130, entities may be selected from the auxiliary dataset based on the geospatial relationship with the entity. For example, entities having containing shapes which contain the entity of interest may be selected. As another example, entities within a threshold distance from the entity of interest may be selected. Other geospatial-based selection criteria may be employed.

On Step 140, values for new attributes may be computed automatically. The values may be computed by counting the number of entities or portion thereof which were selected on Step 130. For example, an attribute may represent a number of entities of a given type within a threshold distance from the entity of interest. Based on the types of entities, a plurality of such attributes may be created and their value computed. The type of the entity may be determined based on one or more attributes of the instance in the auxiliary dataset. In some cases, types of different abstraction levels may be utilized, such as generic types being based on one attribute and more concrete types being based on the one attribute and additional attributes. For example, one generic type of entity may be "store", while more concrete types may include "TIFFANY'S™ store", "jewelry store", "store located on the fifth avenue", "store located in a five store building", or the like. As can be appreciated, the same instance may be represented by several different types.

As another example, the computed attribute may be a minimal distance from an entity of a certain type. As a result of having different entity types, different minimal distance attributes may be computed, such as minimal distance to a trainway station, minimal distance to a parking lot, minimal distance to a shopping mall, minimal distance to a competitor store, or the like.

As yet another example, the computed attributes may be the attributes of the closest instance of an entity type. For example, the potential attributes may be: (1) bus lines stopping at the nearest bus station; (2) nearest bus station having a rooftop?; (3) nearest bus station being smoke-free?. Different entity types may have different attributes and therefore the computed attributes may be different for different entity types. In a key-value pair system, the computed attribute may be (closesetTYPE_KEY, VALUE), where TYPE is the type of the entity and the nearest instance of type TYPE has the attribute (KEY, VALUE).

As yet another example, the computed attributes may be the attributes of containing shapes containing the entity of interest. The selected auxiliary entities may be entities having geospatial representation of a shape which contains the entity of interest. The computed attribute may be an attribute of the containing shape. For example, consider again a key-value pair system, assuming an auxiliary instance is associated with a containing shape, the computed attribute may be (containingID_KEY, VALUE), where ID is an identifier of the auxiliary instance, and the auxiliary instance having the key-value pair (KEY, VALUE).

As yet another example, the computed attributes may be attributes representing a value of a predicate. The computed attribute may be derived from the dataset, such as by computing a predicate based on the dataset. As an example, one predicate may be whether a number of floors of the building in which the entity resides is above a threshold. Consider, for example, an hypothesis that is based on whether a firm is located at the tenth floor or higher (e.g., numberOfFloors>10 for the building at the address of the firm). Such a computed attribute may be indicative of a quality of the firm (e.g., top-tier law firms may be located at skyscrapers and located at high floors; while this is not a direct indication of quality, such a computed attribute might be useful as an indirect indication, which, together with other attributes, may be used to predict the firm's quality).

In some exemplary embodiments, the computed attributes are computed based on geospatial relationship but they themselves do not include explicit geospatial information, such as a location or a shape.

On Step 150, based on the new attributes, one or more hypotheses may be generated. The hypothesis generating may comprise validating or refuting potential hypotheses that are based on the new attributes. A potential hypothesis that is based, at least in part, on a new attribute, may be obtained, and labels of a training dataset may be utilized to validate or refute it. A proper subset of the potential hypotheses may be selected based on a statistical metric, such as but not limited to statistical correlation, statistical entropy, chi-squared test, or the like. In some cases, new attributes that are not used by any validated hypothesis may be ignored.

On Step 170*a*, a predictive model is built using the generated hypothesis. The predictive model may be built using the labeled dataset and the new attributes to encode features of the instances. The predictive model may be trained using supervised learning technique. The predictive model may then be used to predict a label for unlabeled instance. In some cases, the prediction may comprise obtaining the instance for prediction, computing for the instance the values of the new attributes. The computation may be performed similarly to Steps 130-140. In some cases, the computation does not require computing the values of attributes that are filtered as being associated with refuted hypotheses.

On Step 170*b*, geospatial insights may be automatically derived based on the hypothesis. New attributes may be computed for an instance, and the values of which may be used to derive an insight that is based on geospatial information. The insight may be displayed to the user. An exemplary display is discussed hereinbelow.

Figure 2:
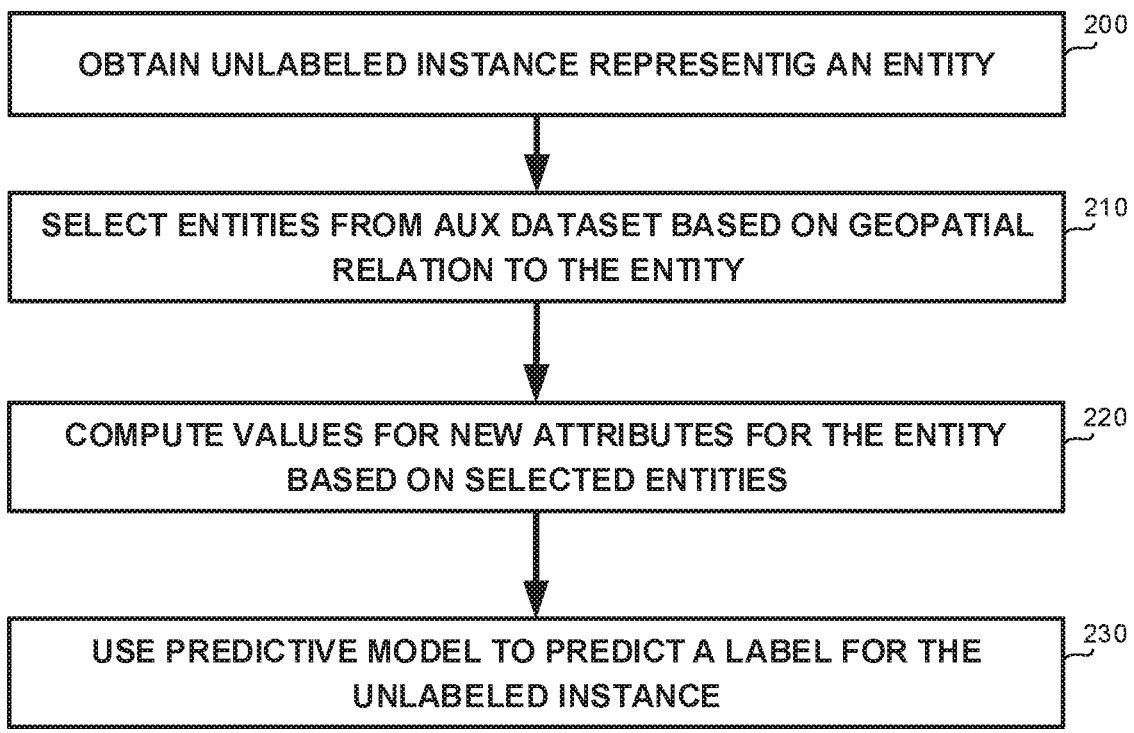
FIG. 2 shows a flowchart diagram of a method, in accordance with some exemplary embodiments of the disclosed subject matter.

Referring now to FIG. 2, showing a flowchart diagram of a method, in accordance with some exemplary embodiments of the subject matter.

On Step 200, an unlabeled instance is obtained. The unlabeled instance may represent an entity having a geospatial representation, also referred to as the entity of interest. The unlabeled instance may comprise or otherwise be associated with a geospatial attribute directly or indirectly indicating the geospatial representation of the entity. The unlabeled instance may be an instance similar to the labeled instance of the labeled dataset, but without having a known label. It may be desired to predict a label for the unlabeled instance.

On Steps 210-220, similarly to steps 130-140, entities from an auxiliary dataset of geospatial entities are selected in view of a geospatial relation with the entity of interest. In some exemplary embodiments, only attributes that relate to validated hypotheses generated on Step 150 are required, and therefore only the values of such attributes are computed on Step 220. The values of the new attributes may be added to the unlabeled instance.

On Step 230, a predicative model which was trained in view of the labeled dataset (e.g., on Step 170*a*) may be consulted to predict a label for the unlabeled instance. The prediction may be performed using the new attributes whose value is computed based on the auxiliary dataset.

In some exemplary embodiments, the auxiliary dataset utilized in the method of FIG. 2 may be the same as the auxiliary dataset used in the method of FIG. 1. Additionally or alternatively, the auxiliary datasets may be similar datasets but having different content, such as dataset of different vendors, datasets associated representing different geographical locations, or the like. The different dataset may or may not represent the entities in the same manner, such as using structured records, using key-value pairs, or using any different representation manner.

Figure 3A:
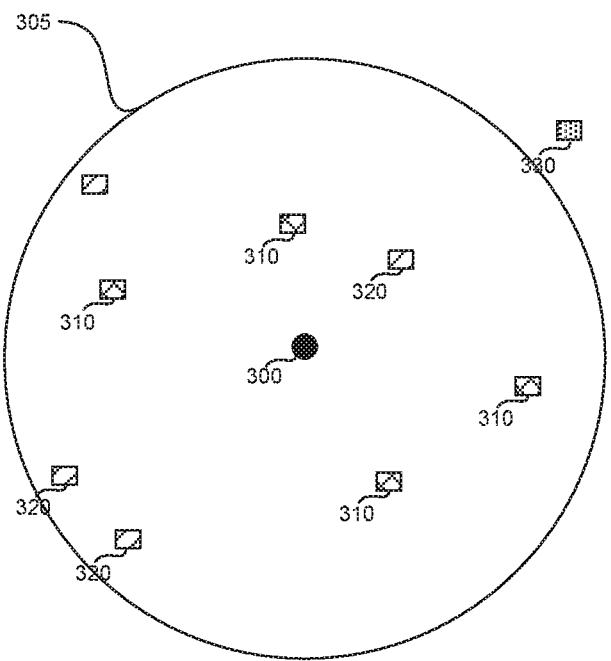
FIGS. 3A-3C show illustrations of geospatial relation, in accordance with some exemplary embodiments of the disclosed subject matter.

FIG. 3A exemplifies a potential geospatial relation, in accordance with some exemplary embodiments of the disclosed subject matter. Entities that are within a predetermined range (305) of an entity of interest, Entity 300 may be identified. There may be entities of different types. For example, there are four entities of a first type (310) within Range 305 from Entity 300. There are four entities of a second type (320) within Range 305 from Entity 300. There are no entities of a third type (330) within Range 305 from Entity 300.

In some cases, types of entities may be dictated by attributes thereof. An entity having one or more attributes, or specific values thereof, may be considered as an entity of a certain type. In some cases, one type may subsume another type, such as each entity of Type 310 may also be of Type 320. Additionally or alternatively, some types may partially overlap with others, such as some entities of Type 310 may be also of Type 320 while other entities of Type 310 may not be of Type 320.

In some exemplary embodiments, a number of entities of each type within Range 305 may be computed and added as a new attribute of Entity 300 that is used for an hypothesis. For example, assuming Type 310 is subsumed by Type 320, then the new attributes of Entity 300 may include the following: (Type-310-count, 4), (Type-320-count, 8), (Type-330-count, 0).

Figure 3B:
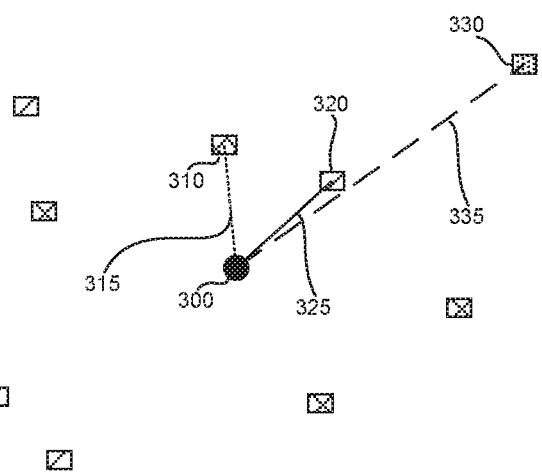

FIG. 3B exemplifies a minimal distance relationship, in accordance with some exemplary embodiments of the disclosed subject matter. A minimal distance to each entity type may be computed. A Minimal Distance 315 may be computed for Type 310. Similarly, Minimal Distances 325, 335 may be computed for Types 320, 330. In some exemplary embodiments, the new attribute may be the distance itself. For example, the new attributes of Entity 300 may include (Type-310-distance, Distance 315), (Type-320-distance, Distance 325), (Type-330-distance, Distance 335). In some cases, only distances within a threshold, such as Range 305, may be taken into consideration. Additionally or alternatively, a new attribute for types for which no instance exists within the range may be added to indicate such information. The potential value may be, for example (Type-330-distance, NULL), (Type-330-distance, INFINITE), or the like.

In some exemplary embodiments, based on the instance of each type that is closest to Entity 300, new attributes may be added to Entity 300. In some exemplary embodiments, each attribute of the instance together with its value may be added to Entity 300. For example, for each key-value pair (KEY, VALUE) associated with the closest instance of Type 310, a potential attribute of (Nearby-Type-310-KEY, VALUE) may be added for Entity 300. In some exemplary embodiments, the potential attributes may be added based on a subset of the attributes of the instance, such as excluding attributes used to define the instance to be of Type 310.

Figure 3C:
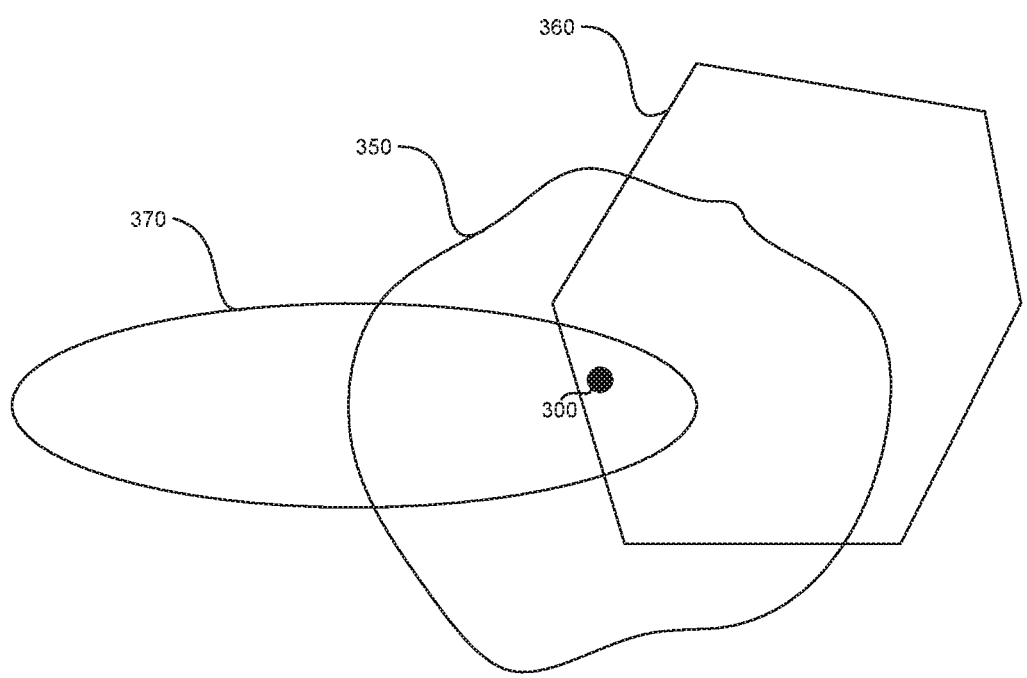

Referring now to FIG. 3C, illustrating a containment spatial relationship, in accordance with the disclosed subject matter. Entity 300 may be contained by entities having a shape, such as Shapes 350, 360 and 370. New attributes may be added to Entity 300 based on the attributes of the entities associated with each containing shape. For example, for each key-value pair of a containing attribute, (KEY, VALUE), the new attribute of (Contained-by-KEY, VALUE) may be added. In some exemplary embodiments, the key of the new attribute may indicate the type of the containing entity.

Figure 4:
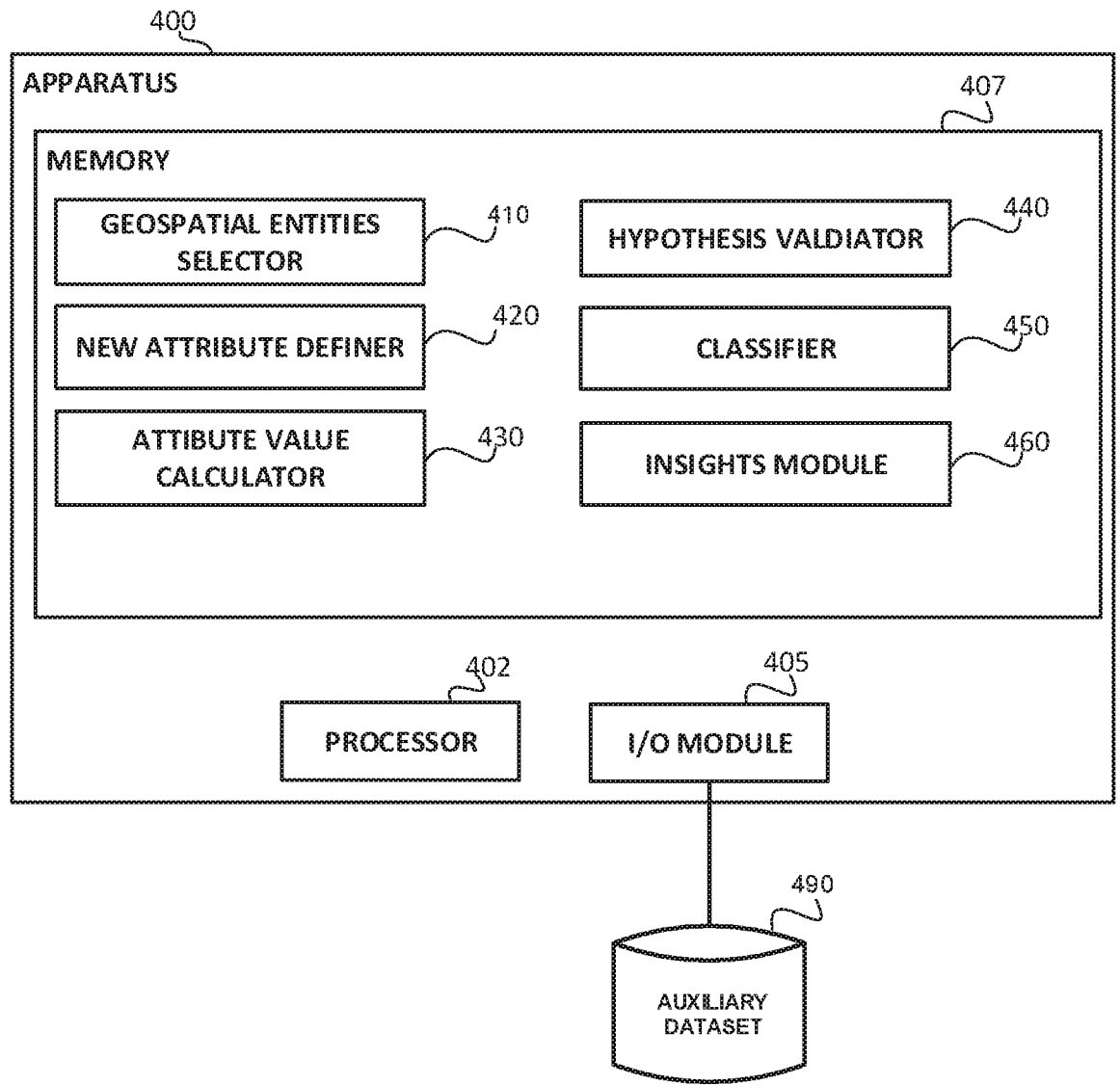
FIG. 4 shows a block diagram of an apparatus, in accordance with some exemplary embodiments of the disclosed subject matter.

Referring now to FIG. 4, showing a block diagram of an apparatus, in accordance with some exemplary embodiments of the disclosed subject matter. An Apparatus 400 may be configured to perform automated hypothesis generation based on geospatial information.

In some exemplary embodiments, Apparatus 400 may comprise a Processor 402. Processor 402 may be a Central Processing Unit (CPU), a microprocessor, an electronic circuit, an Integrated Circuit (IC) or the like. Processor 402 may be utilized to perform computations required by Apparatus 400 or any of it subcomponents.

In some exemplary embodiments of the disclosed subject matter, Apparatus 400 may comprise an Input/Output (I/O) Module 405. I/O Module 405 may be utilized to provide an output to and receive input from a user. For example, the user may be presented with a visual map showing entities and geospatial relations therebetween, visually indicating insights, or the like. Additionally or alternatively, the user may provide rules, command and configurations used by Apparatus 400. Additionally or alternatively, the user may review predictions provided by Apparatus 400.

In some exemplary embodiments, I/O Module 405 may be used to access an external data source, such as retaining Auxiliary Dataset 490, or other sources retaining geospatial-related datasets.

In some exemplary embodiments, Apparatus 400 may comprise a Memory 407. Memory 407 may be a hard disk drive, a Flash disk, a Random Access Memory (RAM), a memory chip, or the like. In some exemplary embodiments, Memory 407 may retain program code operative to cause Processor 402 to perform acts associated with any of the subcomponents of Apparatus 400. Additionally or alternatively, Memory 407 may retain a labeled dataset to be used for training.

Geospatial Entities Selector 410 may be configured to select from Auxiliary Dataset 490, geospatial entities. Geospatial Entities Selector 410 may select the entities based on their geospatial relation to an entity of interest, such as within a predetermined distance therefrom, containing the entity of interest, or the like.

New Attribute Definer 420 may be configured to define new attributes for entities based on geospatial data. The new attributes may be features that can be derived from Auxiliary Dataset 490, in view of geospatial relation of an entity of interest with geospatial entities retained in the Auxiliary Dataset 490. New Attribute Definer 420 may be configured to enumerate all possible new attributes and add such new attributes to the entities of interest. Additionally or alternatively, only a subset of the new attributes may be defined by Potential Feature Definer 420. Each new attribute may be associated with one or more potential hypotheses that are to be validated or refuted.

Attribute Value Calculator 430 may be configured to calculate a value for a new attribute based on Auxiliary Dataset 490. Attribute Value Calculator 430 may be configured to utilize data of entities selected by Geospatial Entities Selector 410 for an entity of interest in order to calculate the value of a new attribute for the entity. In some exemplary embodiments, Attribute Value Calculator 430 may calculate a number of instances of a type of entity within a range from the entity of interest. Additionally or alternatively, Attribute Value Calculator 430 may be configured to calculate a minimal distance between the entity of interest and a nearest instance of an entity type. Additionally or alternatively, Attribute Value Calculator 430 may be configured to determine the value of a new attribute based on a value of an attribute of a selected entity, such as a containing entity, a nearest entity of a type, or the like.

Hypothesis Validator 440 may be configured to validate a hypothesis. The validation may be based on whether a labeled dataset refutes or validates that a value of an attribute (or combination thereof) is indicative of a label in a manner that is statistically significant. Statistical metrics may be employed to validate or refute hypotheses.

Classifier 450 may be configured to predict, using a predictive model, a label for an instance. The predictive model may be trained a training dataset that includes new attributes computed using Auxiliary Dataset 490. Additionally or alternatively, Classifier 450 may be applied on an unlabeled instance that includes new attributes comptued using Auxilairy Dataset 490. An unlabeled instance may be enhanced by utilizing Geospatial Entities Selector 410 for the entity represented by the unlabeled instance, and using the selected one or more entities of Auxiliary Dataset 490 to compute the values for new attributes, such as using Attribute Value Calculator 430.

Insights Module 460 may be configured to derive insights based on the new attributes added using Auxiliary Dataset 490 to the labeled dataset. The insights may be presented to a user in a graphical manner.

In some exemplary embodiments, a geo-spatial insight may be displayed to the user in one or more forms.

In some exemplary embodiments, a text description of the geo-spatial feature is provided. The text description may identify the geo-spatial relation relating to the insight, the relevant entities, and the impact. The impact may be provided as a general statement on the direction of the effect (e.g., higher sales, more likely to churn) or a quantifiable metric (e.g., lift or $R^2$). The text description may be accurate and provide the exact meaning of the geo-spatial insight. As an example, the accurate version may be: "Stores closer than 450 meter to a point with attribute value 'train station' according to OpenStreetMap have aX2.5 chance of being top locations". As can be appreciated, the accurate version may indicate actual distance (450 meter), may identify the data source (OpenStreetMap), may identify accurate measured impact (X2.5 chance). Additionally, or alternatively, a less accurate but more readable description may be provided. Referring to the same example above, an alternative description may be "Stores near railway stations have higher sales". In some exemplary embodiments, the user may alternate between the two versions for the same geo-spatial insight.

In some exemplary embodiments, a geo-spatial insight may be displayed with statistical metrics, such as displayed in charts, graphs, or the like. In some exemplary embodiments, a collection of statistical metrics such as info-gain, $R^2$, lifts, or the like, may be computed and displayed to the user to prove the alleged insight to the human user.

Figure 5:
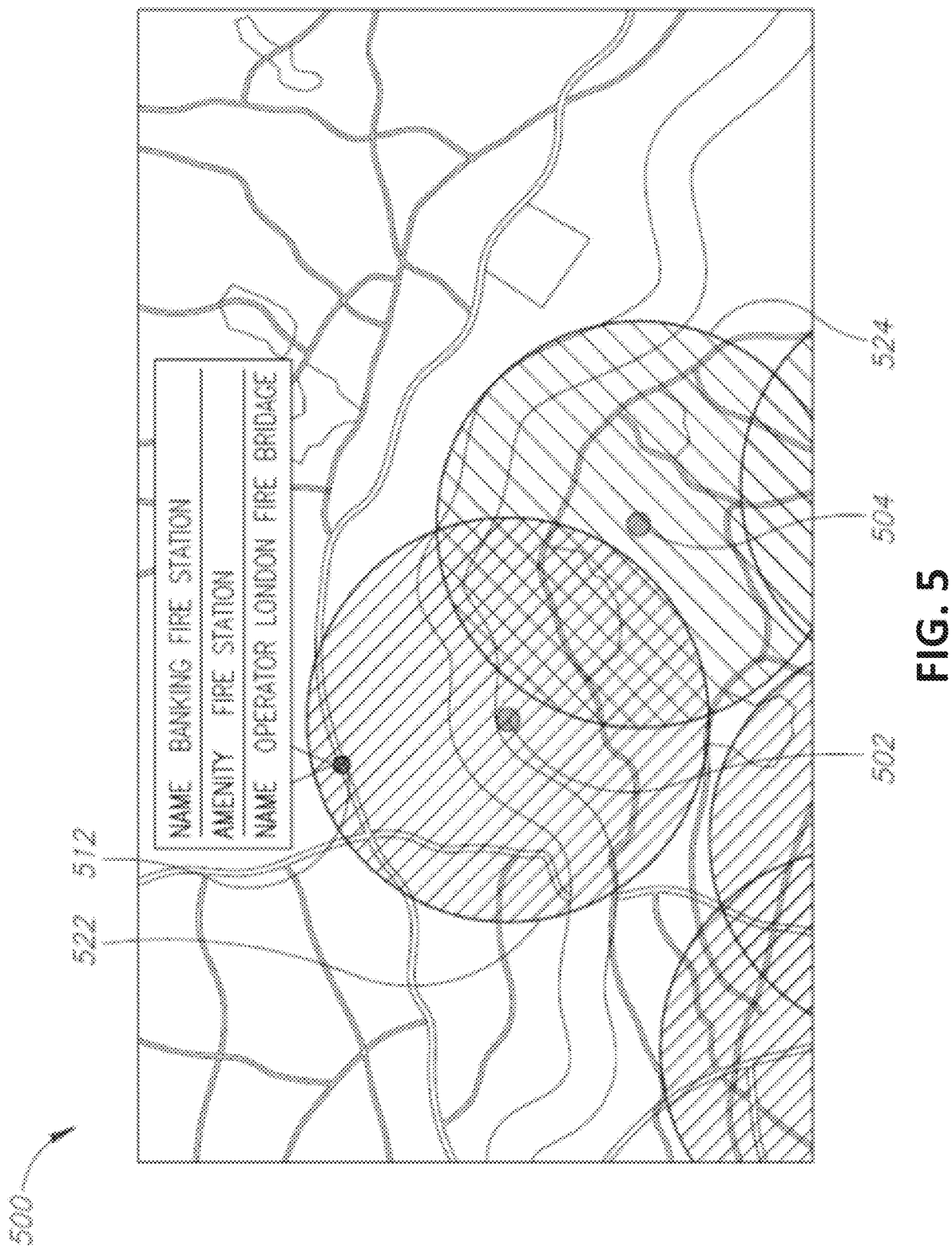
FIG. 5 shows an illustration of a display, in accordance with some exemplary embodiments of the disclosed subject matter.

In some exemplary embodiments, a map visualization may be used to display the geo-spatial insight. FIG. 5 shows an illustration of a display of a map visualization, in accordance with some exemplary embodiments of the disclosed subject matter. A map segment to be displayed is determined, either automatically or by the user. In some exemplary embodiments, the segment is automatically selected based on having sufficient number of examples exemplifying the insight. In some exemplary embodiments, the segment is selected so as to have at least one positive example and at least one negative example. An entity of interest is displayed on the map. For example, Stores 502, 504 may be displayed. Entities which are relevant for the insight and have the relationship with the entities of interest are also displayed. For example, Fire Station 512. Color or other visual marking may be used to notate the label of the examples. Circles may be used to show distance, such as Circles 522, 524. The circles may have the same radius, as is defined by the relationship in the geo-spatial insight. Such radius may exceed or be below the actual distance to a relevant entity. In some exemplary embodiments, different visualization is provided to positive and negative examples. For example, positive examples may be displayed in green, while negative may be displayed in red.

The visualization of FIG. 5 shows a Map 500 exemplifying the geo-spatial insight of stores that are less than 1.6 km from a fire station correlate with lower risk of fire damage, with correlation of 0.7. Map 500 shows a positive example (Circle 522) and a negative example (Circle 524).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    obtaining a labeled dataset, wherein each labeled instance in the labeled dataset comprises one or more attributes and a target label, wherein the one or more attributes comprise, directly or indirectly, at least one geospatial attribute, wherein a first geospatial attribute of a labeled instance in the labeled dataset indicates a first geospatial location of an entity represented by the labeled instance;
    obtaining an auxiliary dataset, wherein the auxiliary dataset comprises auxiliary instances, each auxiliary instance of which comprising attributes, wherein the attributes comprise one or more geospatial attributes, wherein a second geospatial attribute of an auxiliary instance in the auxiliary dataset indicates a second geospatial location of an entity represented by the auxiliary instance; and
    automatically performing, by a computer, hypothesis generation based on the labeled dataset and the auxiliary dataset, wherein said automatically performing the hypothesis generation comprises, for the labeled instance in the labeled dataset:
        automatically selecting the auxiliary instance in the auxiliary dataset based on a geospatial relation between the first geospatial attribute and the second geospatial attribute, wherein the geospatial relation comprises at least a distance between the first and second geospatial locations;
        automatically computing, based on the auxiliary instance, one or more new attributes for the labeled instance, wherein the one or more new attributes are indicative of the distance, wherein the one or more attributes of the labeled instance exclude the one or more new attributes; and
        subsequent to said computing, automatically adding, by the computer, the one or more new attributes as additional attributes of the labeled instance in the labeled dataset, whereby the labeled dataset is modified to include the one or more new attributes.

2. The method of claim 1, wherein said automatically performing hypothesis generation is performed for each labeled instance in the labeled dataset.

3. The method of claim 1, wherein said selecting comprises selecting the auxiliary instance in case the distance is within a threshold distance.

4. The method of claim 3, wherein the one or more new attributes comprise a new attribute representing a count of entities having a value of an attribute that are within the threshold distance.

5. The method of claim 1, wherein the one or more new attributes comprise a new attribute representing a value of an attribute of the auxiliary instance, wherein the auxiliary instance comprises a closest instance of an entity type to the first geospatial location of the labeled instance.

6. The method of claim 1, wherein said automatically performing hypothesis generation comprises: determining a collection of auxiliary entities within a threshold distance from the first geospatial location of the labeled instance.

7. The method of claim 6, wherein the one or more new attributes comprise a plurality of new attributes, each new attribute of which stating a minimal distance from the first geospatial location to an instance of a different entity type from the collection of auxiliary entities.

8. The method of claim 1, wherein the distance indicates that the auxiliary instance comprises a containing shape representing an entity that contains the first geospatial location of the labeled instance, wherein the one or more new attributes comprise attributes associated with the containing shape.

9. The method of claim 1 further comprising building a predictive model based on the labeled dataset and the one or more new attributes of each labeled instance in the labeled dataset, wherein the predictive model is configured to predict a label for an unlabeled instance, and wherein the predictive model is trained using a learning technique.

10. The method of claim 9, wherein the learning technique is a supervised learning technique.

11. The method of claim 1 further comprising analyzing the labeled dataset and the one or more new attributes of each labeled instance in the labeled dataset to derive geospatial insights; and displaying the geospatial insights to a user.

12. The method of claim 1 further comprises performing hypothesis validation to select a proper subset of one or more potential hypotheses, wherein each potential hypothesis of the one or more potential hypotheses is associated with at least one of the one or more new attributes.

13. The method of claim 12, wherein the hypothesis validation comprises selecting a subset of potential hypotheses based on a statistical metric.

14. The method of claim 1, further comprising performing an abstraction method to enrich the auxiliary dataset with abstracted features, wherein said automatically performing hypothesis generation comprises using the abstracted features.

15. A computerized apparatus having a processor, the processor being adapted to perform steps of:
obtaining a labeled dataset, wherein each labeled instance in the labeled dataset comprises one or more attributes and a target label, wherein the one or more attributes comprise, directly or indirectly, at least one geospatial attribute, wherein a first geospatial attribute of a labeled instance in the labeled dataset indicates a first geospatial location of an entity represented by the labeled instance;
obtaining an auxiliary dataset, wherein the auxiliary dataset comprises auxiliary instances, each auxiliary instance of which comprising attributes, wherein the attributes comprise one or more geospatial attributes, wherein a second geospatial attribute of an auxiliary instance in the auxiliary dataset indicates a second geospatial location of an entity represented by the auxiliary instance; and
automatically performing, by the processor, hypothesis generation based on the labeled dataset and the auxiliary dataset, wherein said automatically performing the hypothesis generation comprises, for the labeled instance in the labeled dataset:
automatically selecting the auxiliary instance in the auxiliary dataset based on a geospatial relation between the first geospatial attribute and the second geospatial attribute, wherein the geospatial relation comprises at least a distance between the first and second geospatial locations;
automatically computing, based on the auxiliary instance, one or more new attributes for the labeled instance, wherein the one or more new attributes are indicative of the distance, wherein the one or more attributes of the labeled instance exclude the one or more new attributes; and
subsequent to said computing, automatically adding, by the processor, the one or more new attributes as additional attributes of the labeled instance in the labeled dataset, whereby the labeled dataset is modified to include the one or more new attributes.

16. A computer program product comprising a non-transitory computer readable storage medium retaining program instructions, which program instructions when read by a processor, cause the processor to perform a method comprising:
obtaining a labeled dataset, wherein each labeled instance in the labeled dataset comprises one or more attributes and a target label, wherein the one or more attributes comprise, directly or indirectly, at least one geospatial attribute, wherein a first geospatial attribute of a labeled instance in the labeled dataset indicates a first geospatial location of an entity represented by the labeled instance;
obtaining an auxiliary dataset, wherein the auxiliary dataset comprises auxiliary instances, each auxiliary instance of which comprising attributes, wherein the attributes comprise one or more geospatial attributes, wherein a second geospatial attribute of an auxiliary instance in the auxiliary dataset indicates a second geospatial location of an entity represented by the auxiliary instance; and
automatically performing, by the processor, hypothesis generation based on the labeled dataset and the auxiliary dataset, wherein said automatically performing the hypothesis generation comprises, for the labeled instance in the labeled dataset:
automatically selecting the auxiliary instance in the auxiliary dataset based on a geospatial relation between the first geospatial attribute and the second geospatial attribute, wherein the geospatial relation comprises at least a distance between the first and second geospatial locations;
automatically computing, based on the auxiliary instance, one or more new attributes for the labeled instance, wherein the one or more new attributes are indicative of the distance, wherein the one or more attributes of the labeled instance exclude the one or more new attributes; and
subsequent to said computing, automatically adding, by the processor, the one or more new attributes as additional attributes of the labeled instance in the labeled dataset, whereby the labeled dataset is modified to include the one or more new attributes.

17. The computer program product of claim 16, wherein said automatically performing hypothesis generation is performed for each labeled instance in the labeled dataset.

18. The computer program product of claim 16, wherein the one or more new attributes comprise a new attribute representing a count of entities having a value of an attribute that are within a threshold distance from the first geospatial location.

19. The computer program product of claim 16, wherein the one or more new attributes comprise a new attribute representing a value of an attribute of the auxiliary instance, wherein the auxiliary instance comprises a closest instance of an entity type to the first geospatial location of the labeled instance.

20. The computer program product of claim 16, wherein said selecting comprises selecting the auxiliary instance in case the distance is within a threshold distance.

21. The computer program product of claim 16, wherein said automatically performing hypothesis generation comprises: determining a collection of auxiliary entities within a threshold distance from the first geospatial location of the labeled instance.

22. The computer program product of claim 16, wherein the distance indicates that the auxiliary instance comprises a containing shape representing an entity that contains the first geospatial location of the labeled instance, wherein the one or more new attributes comprise attributes associated with the containing shape.

23. The computer program product of claim 16, wherein the method further comprises building a predictive model based on the labeled dataset and the one or more new attributes of each labeled instance in the labeled dataset, wherein the predictive model is configured to predict a label for an unlabeled instance, and wherein the predictive model is trained using a learning technique.

24. The computer program product of claim 23, wherein the learning technique is a supervised learning technique.

25. The computer program product of claim 16, wherein the method further comprises analyzing the labeled dataset and the one or more new attributes of each labeled instance in the labeled dataset to derive geospatial insights; and displaying the geospatial insights to a user.

26. The computer program product of claim 16, wherein the method further comprises performing hypothesis validation to select a subset of one or more potential hypotheses, wherein each potential hypothesis of the one or more potential hypotheses is associated with at least one of the one or more new attributes, and wherein the hypothesis validation comprises selecting a subset of potential hypotheses based on a statistical metric.

* * * * *